United States Patent [19]

Smith

[11] Patent Number: 5,095,611

[45] Date of Patent: Mar. 17, 1992

[54] METHOD OF ASSEMBLING AN ELECTRIC MOTOR TO ELIMINATE A SEPARATE END PLAY ADJUSTMENT

[75] Inventor: Oscar Smith, Pt. Stanley, Canada

[73] Assignee: Siemens Automotive Limited, London, Canada

[21] Appl. No.: 664,918

[22] Filed: Mar. 5, 1991

[51] Int. Cl.⁵ .............................................. H02K 15/14
[52] U.S. Cl. ........................................ 29/596; 310/42; 310/90
[58] Field of Search ..................... 29/596, 598; 310/42, 310/89, 90, 91

[56] References Cited

U.S. PATENT DOCUMENTS 3,419,957  1/1969  Stone ...................................... 29/596
4,295,268  10/1981  Punshon et al. ....................... 29/596

Primary Examiner—Carl E. Hall
Attorney, Agent, or Firm—George L. Boller; Russel C. Wells

[57] ABSTRACT

A method of making an electric motor which eliminates the need for a separate endplay adjustment wherein permanent magnets act on the armature laminations to urge the motor shaft in one direction so that the entire endplay appears at only one end of the shaft.

5 Claims, 2 Drawing Sheets

METHOD OF ASSEMBLING AN ELECTRIC MOTOR TO ELIMINATE A SEPARATE END PLAY ADJUSTMENT

FIELD OF THE INVENTION

This invention relates generally to methods of making electric motors.

BACKGROUND AND SUMMARY OF THE INVENTION

When a small mass-produced permanent magnet electric D.C. motor is manufactured, it will have a certain amount of shaft endplay, meaning that the shaft can be displaced axially relative to the housing. Heretofore it has been the typical practice to perform an endplay adjustment as a separate step after the shaft has been assembled to the housing. Such an adjustment can be internal or external. It involves measuring the amount of endplay, selecting a device of appropriate thickness, such as a clip, washer, etc., and assembling the device onto the motor such that the device will limit the shaft endplay to a tolerable amount.

The present invention relates to a method of making a motor which eliminates the need for a separate endplay adjustment. The invention relies in part upon a certain positioning of the motor's permanent magnets during their assembly into one part of the motor housing which results in the magnets' force acting on the motor shaft in a manner that urges the shaft in one direction along the shaft's axis so that the entire endplay is caused to appear at only one end of the shaft. In this way the shaft is properly axially located so that the existence of endplay in whatever amount is actually present will not result in the axial position of the shaft relative to the housing being outside a specified tolerance during motor operation. The elimination of a separate endplay adjustment saves on time, labor, and materials in the assembly of such motors.

The invention will be disclosed with reference to the ensuing description which is accompanied by drawings illustrating the best mode contemplated at this time for carrying out the invention.

DESCRIPTION OF THE PREFERRED EMBODIMENT

Figure 1:
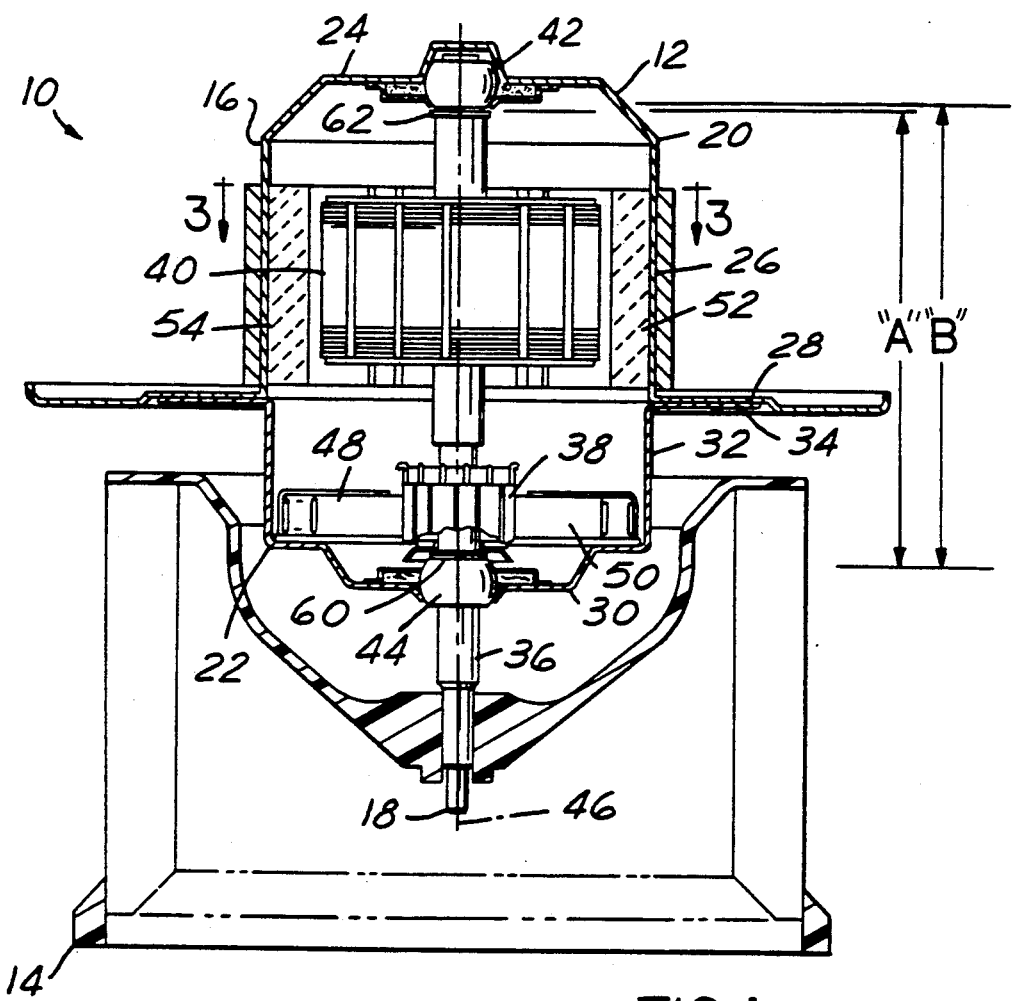
FIG. 1 is a longitudinal cross section through a motor which embodies the inventive principles, and it also illustrates a blower wheel as the motor's load.

FIG. 1 shows a motor and blower wheel assembly 10 of the type that is used in the climate control system of an automotive vehicle. The assembly comprises an electric D.C. motor 12 of the permanent magnet type and a blower wheel 14 of the squirrel cage type.

Motor 12 comprises a housing 16 and a shaft assembly 18. Housing 16 is composed of two parts 20 and 22 that are drawn from sheet metal and assembled together. Part 20 comprises an end wall 24, a cylindrical side wall 26 extending from end wall 24, and an annular flange 28 extending around the outside of side wall 26 at the end opposite end wall 24. Part 22 comprises an end wall 30, a cylindrical side wall 32 extending from end wall 30, and an annular flange 34 extending around the outside of side wall 32 at the end opposite end wall 30. Flanges 28 and 34 are disposed in abutment and the two housing parts 20 and 22 are suitably joined so that the two side walls 26, 32 and the two end walls 24, 30 form a cylindrical enclosure.

Shaft assembly 18 comprises a shaft 36, a commutator 38, and a lamination stack 40. Commutator 38 and stack 40 are internal of the motor. One end portion of shaft 36 is journaled in a bearing 42 on end wall 24. The opposite end portion is journaled in a bearing 44 on end wall 30. Shaft 36, bearings 42, 44, and end walls 24, 30 are all coaxial and their co-axis is designated by the numeral 46.

The end portion of shaft 18 that is journaled in bearing 44 on end wall 30 passes through that end wall via a suitable hole therein, and it is to the external portion of shaft 18 that the hub of wheel 14 is fitted and secured.

The interior of the enclosure also contains spring-loaded brushes 48, 50 that are mounted in conventional fashion to ride against commutator 38 and convey electric current to armature coils (not shown in the interest of clarity of FIG. 1) wound on stack 40 in a conventional manner. The brushes are connected by electric wires (not shown) passing through the enclosure to a plug that is accessible from the exterior of the motor to enable electric current to be delivered to the motor.

Identical permanent magnets 52, 54 are also disposed within the interior of the enclosure and are held in place in the manner shown by identical metal clips 56, 58. Each permanent magnet has an arcuate shape, as viewed transversely (FIG. 3), for conformal fitting against the inside of side wall 26.

It is to be observed in FIG. 1 that although stack 40 is circumferentially bounded by permanent magnets 52, 54, it is disposed closer to one axial end of the magnets than the opposite axial end of the magnets. Because a large part of the shaft assembly is ferromagnetic, particularly the laminations, a magnetic force is exerted on shaft assembly 18 via the stack, and it will try to position the entire shaft assembly axially relative to housing 16 such that the laminations are centered lengthwise of the magnets. In the illustrated embodiment this causes the entire shaft assembly to be urged axially relative to housing 16 in one direction along axis 46, this direction being toward bearing 44. Before this urging can attain lengthwise centering of the stack however, it causes a shoulder 60 of shaft assembly 18 to abut the face of bearing 44 that is toward the interior of the enclosure. The result is that the shaft is caused to bear lightly against the bearing.

The shaft assembly has a shoulder 62 at the opposite end which faces bearing 42. The axial dimension "A" along the shaft assembly between shoulders 60 and 62 is a toleranced dimension. The two housing parts are fabricated with tolerance such that when they are assembled together, the distance between the confronting inner faces of bearings 42 and 44 is a toleranced dimension "B" that is more than the toleranced dimension "A" along the shaft assembly between shoulders 60 and 62. The difference between these two toleranced dimensions "A" and "B" represents the endplay that exists in the assembled motor.

Figure 3:
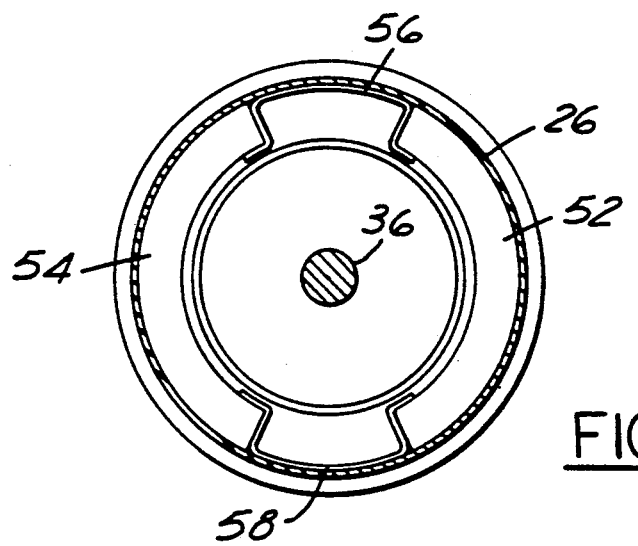
FIG. 3 is a view in the direction of arrows 3—3 in FIG. 1.
Figure 2:
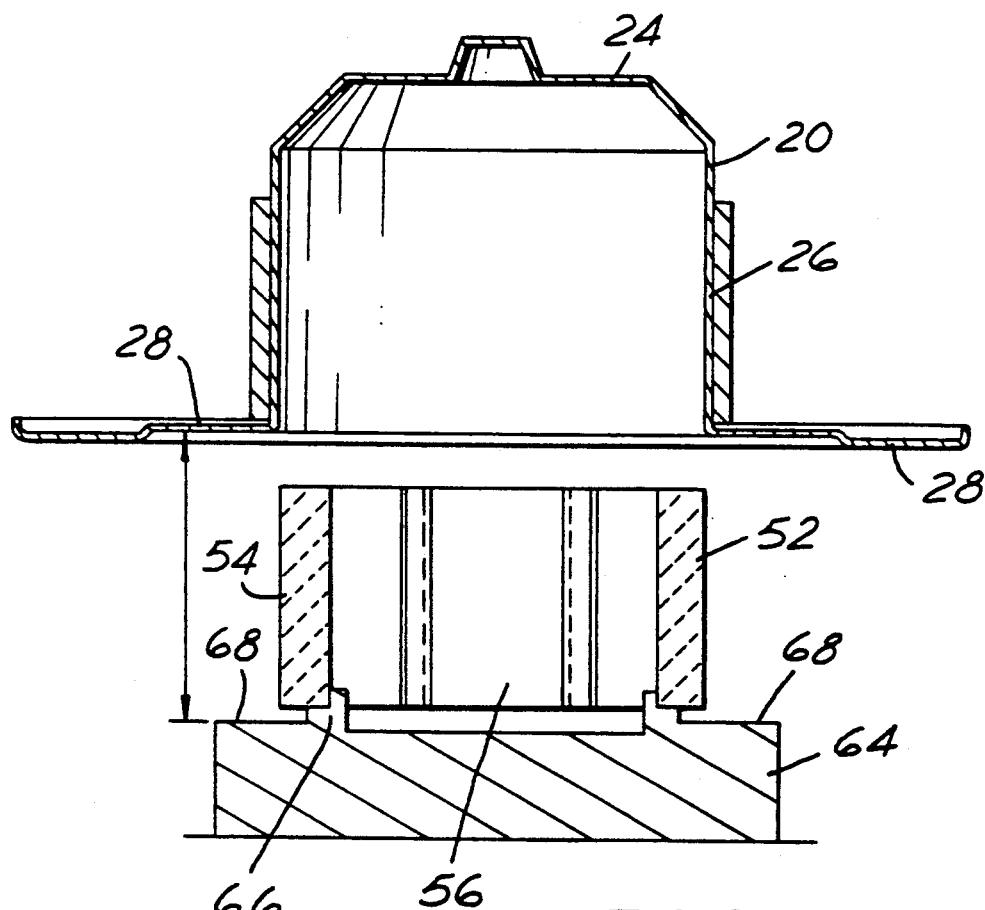
FIG. 2 is a longitudinal cross section taken during the process of making the motor.

By virtue of the arrangement of the permanent magnets on the motor housing which causes the magnetic force acting to urge the shaft assembly toward bearing 44, the entire endplay is caused to appear between shoulder 62 and bearing 42. This assures that the shaft is located in relation to the housing in a predetermined manner. By controlling the manufacturing tolerances on the several parts involved, the endplay may be kept within a desired tolerance, and therefore there is no need to perform a separate endplay adjustment. FIG. 3 shows how the magnets are accurately axially located.

The two clips 56, 58 and the two permanent magnets 52, 54 are placed upright on an anvil 64 which includes suitable means 66 for locating the four parts. Housing part 20 is axially aligned with the four parts and the open end of the housing part is advanced downwardly over the four upright parts to cause the latter to be inserted into the former. Housing part 20 continues to be advanced downwardly until its flange 28 abuts a shoulder 68 surrounding the anvil. This provides a limit stop that thereby limits the extent to which the four upright parts can be inserted into the housing part. Because the housing part has a toleranced dimension from its flange 28 to its bearing 42 so that when assembled with the other housing part 22 the distance between the two bearings 42, 44 is the toleranced dimension "B", the precise positioning of the inserted magnets into housing part 20 will assure the positioning of the magnets such that in the assembled motor, they urge shaft assembly 18 to abut shoulder 60 with bearing 44, as described above.

The direction of the urging force may be changed by changing the relative axial position of the magnets. In other words by inserting the magnets further into the housing, the shaft assembly could be urged to abut shoulder 62 with bearing 42 so that the endplay would appear between bearing 44 and shoulder 60. The direction of the magnetic force in any given motor depends on the nature of the load imposed on the motor. Some blower wheels cause an axial force to be exerted on the motor shaft in one direction and others in the opposite direction. The usual practice will be to design a motor to urge the shaft in the same direction as the axial force that will be exerted on it by the load.

It should also be mentioned that the shoulders that have been referred to above at the opposite ends of the shaft may be shoulders formed directly in the shaft or separate washers that are fitted onto the shaft.

What is claimed is:

1. A method of making an electric motor so as to eliminate the need for making a separate internal end play adjustment of the motor shaft after various parts of said motor have been assembled together, said motor comprising a housing on which said shaft is journaled, a stack of laminations disposed on said shaft, armature winding means disposed on said stack of laminations and connected to commutator means disposed on said shaft, said motor comprising input means, including brush means engaging said commutator means, for delivering electric current to said armature winding means to operate the motor, said motor comprising permanent magnet means disposed within said housing to create a magnetic field pattern with which electric current in said armature winding means interacts to operate said motor, said motor housing comprising plural housing parts cooperatively forming said housing, a first of said housing parts comprising a first journal means for journaling a first end portion of said shaft, a second of said housing parts comprising a second journal means for journaling a second end portion of said shaft, said method comprising manufacturing said shaft to a first predetermined toleranced axial dimension between said first and second end portions thereof, manufacturing said housing parts, including said first and second housing parts, to define in the assembled motor a second predetermined toleranced axial dimension between said first and second journal means which exceeds said first predetermined toleranced axial dimension by a predetermined toleranced difference, and disposing said permanent magnet means on said housing at an axial location which in the assembled motor will cause said permanent magnet means to act on said laminations in a manner that urges said shaft axially of said housing toward a particular one of said first and second journal means such that the entirety of said toleranced difference is caused to be present at a particular one of said first and second end portions of said shaft.

2. A method as set forth in claim 1 in which the step of disposing said permanent magnet means on said housing at an axial location which in the assembled motor will cause said permanent magnet means to act on said laminations in a manner that urges said shaft axially of said housing toward a particular one of said first and second journal means such that the entirety of said toleranced difference is caused to be present at a particular one of said first and second end portions of said shaft comprises axially inserting said permanent magnet means a predetermined axial distance into one of said housing parts.

3. A method as set forth in claim 1 in which the step of axially inserting said permanent magnet means a predetermined axial distance into one of said housing parts comprises supporting and locating one of said permanent magnet means and said first housing part uprightly on an anvil means, axially aligning the other of said permanent magnet means and said first housing part with said one of said permanent magnet means and said first housing part, and then relatively axially advancing said one and said other of said permanent magnet means and said first housing part toward each other until a limit stop that is fixedly located in relation to said anvil means is abutted by a portion of said other of said permanent magnet means and said first housing part to arrest the relative axial advancement when said permanent magnet means has been inserted said predetermined axial distance into said one housing part.

4. A method as set forth in claim 3 in which the step of supporting and locating one of said permanent magnet means and said first housing part uprightly on an anvil means comprises supporting and locating said first housing part uprightly on said anvil means.

5. A method as set forth in claim 4 in which the step of relatively axially advancing said one and said other of said permanent magnet means and said first housing part toward each other until a limit stop that is fixedly located in relation to said anvil means is abutted by a portion of said other of said permanent magnet means and said first housing part to arrest the relative axial advancement when said permanent magnet means has been inserted said predetermined axial distance into said one housing part comprises relatively axially advancing said one and said other of said permanent magnet means and said first housing part toward each other until a limit stop that is fixedly located in relation to said anvil means is abutted by a an annular flange at one axial end of said first housing part.

* * * * *